United States Patent
Sundaresan et al.

(10) Patent No.: US 6,282,502 B1
(45) Date of Patent: Aug. 28, 2001

(54) METHOD OF DESIGNING UNIFORM MOTION, SUBSTANTIALLY VIBRATION-FREE SPUR GEARS

(75) Inventors: Sivakumar Sundaresan, Penfield; Todd C. Rose, Hilton, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/052,184

(22) Filed: Mar. 31, 1998

(51) Int. Cl.$^7$ ..................................................... G06F 17/50
(52) U.S. Cl. ..................................... 703/1; 703/7; 700/98
(58) Field of Search ....................... 703/1, 2, 7; 700/280, 700/97, 98

(56) References Cited

U.S. PATENT DOCUMENTS

| | | | |
|---|---|---|---|
| 1,525,642 | 2/1925 | Cox | 74/462 |
| 4,612,816 | * 9/1986 | Chalik | 74/401 |
| 5,271,288 | * 12/1993 | Hayduk et al. | 74/462 |
| 5,485,761 | * 1/1996 | Rouverol | 74/462 |

OTHER PUBLICATIONS

Turner, I. et al. "Investigation of Characteristic Measures for the Analysis and Synthesis of Precision–Machined Surfaces," Journal of Manufacturing Systems [online]. vol. 14, No. 5, 1995, p. 378+. Retrieved from Proquest Online Database, pp. 1–14.*

Hsia, L. "The Analysis and Design of Harmonic Gear Drives," Proc. of 1988 IEEE Int'l Conf. on Systems, Man, and Cybernetics. vol. 1, Aug. 1988, pp. 616–619.*

Errichello, R., 1989, "A Rational Procedure for Designing Minimum Weight Gears," Proceedings of the 1989 ASME International Power Transmission and Gearing Conference, Chicago, vol. 1, pp. 111–114.

"How to Design Quiet Transmissions," Machine Design, by Raymond J. Drago, Dec. 1980, Chapter 15, pp. 205–212.

"Gear Design," SAE Paper No. 680381, by John C. Leming, Chapter 3, pp. 29–42.

"The Redcuction of Gear Pair Transmission Error by Minimizing Mesh Stiffness Variation," American Gear Manufacturers Association, Paper No. 88–FTM–11, by W. S. Rouverol and W. J. Pearce.

"Load Distribution Program Manual," Gear Dynamics and Gear Noise Research Laboratory, Department of Mechanical Engineering, Ohio State University, Columbus, OH, pp. LDP–2–LDP–20.

"Gear Noise Sources and Their Prediction Using Mathematical Models," by D. R. Houser, SAE Gear Design, Manufacturing and Inspection Manual, 1985 OEM Conference in Philadelphia, Sep. 11, 1985.

"Dynamic Analysis of High Speed Gears by using Loaded Static Transmission Error," by H. N. Ozguven and D. R. Houser, Journal of Sound and Vibration, 1988, vol. 125, pp. 71–83.

* cited by examiner

Primary Examiner—Tariq R. Hafiz
Assistant Examiner—Kyle J. Choi
(74) Attorney, Agent, or Firm—Clyde E. Bailey, Sr.

(57) ABSTRACT

A method of producing uniform motion, vibration-free spur gears useful in rotary processes includes determining gearmesh frequency and its (m) multiples and comparing each to a corresponding (k) multiple of the process frequency. Gear designs with non-matching (m) and (k) multiples are selectable for analysis as to load bearing capability and conformance with predetermined contact ratios.

12 Claims, 6 Drawing Sheets

METHOD OF DESIGNING UNIFORM MOTION, SUBSTANTIALLY VIBRATION-FREE SPUR GEARS

FIELD OF THE INVENTION

This invention relates to a method of designing spur gears. More particularly, the invention concerns such a method that enables the design of uniform motion, substantially vibration-free spur gears useful primarily in rotary equipment, such as, punchers, choppers, slitters, turbines, and the like.

BACKGROUND OF THE INVENTION

In conventional rotary equipment variations and compliances in gear drive systems coupled with process parameters such as speed, stroke rate, punch frequency, motor commutator frequency, etc., cause non-uniform motion transmission and structural vibration and noise. These effects are well known in rotary slitters, rotary punchers, choppers, web conveyance machines, copiers, printers and the like, in which motion transmission between axes of rotation is achieved through a set of mating spur or helical gears. In applications that require small axial clearances (e.g. between a punch and a die), well-designed spur gears are favored over helical gears as they show lower vibration in the axial direction. Spur gears have no significant capability to impart axial errors. However, there is an enormous need to design and manufacture high quality spur gears that transmit motion uniformly and cause lower structural vibration and noise in rotary equipment. Thus, the design and manufacture of high quality spur gears have been a challenge for gear engineers for quite some time.

Figure 1A:
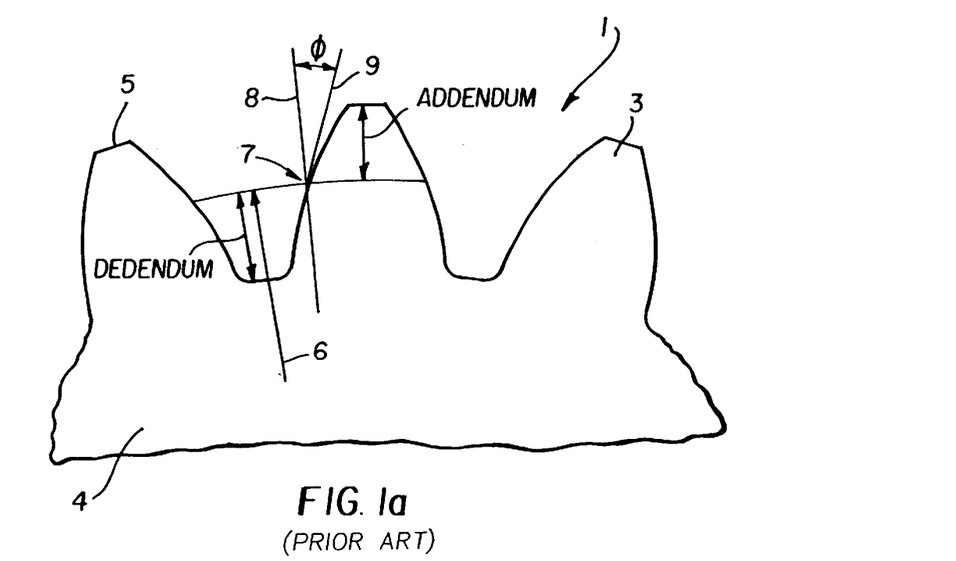
FIG. 1a is a schematic of a partial spur gear.
Figure 1B:
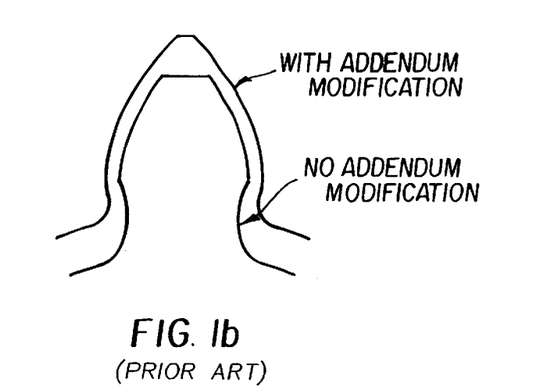
FIG. 1b is a schematic of an enlarged gear tooth showing the effect of addendum modification.
Figure 1C:
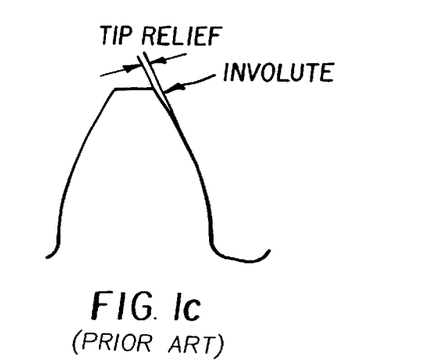
FIG. 1c is an enlarged schematic of a spur gear tooth showing tooth modifications.

According to FIGS. 1a, 1b, 1c, a typical spur gear (partial representation illustrated) has a plurality of teeth 3 arranged 360 degrees about gear body 4. There are several important features of spur gears which are defined herein. One important feature of gear 1 is diametral pitch ($P_d$) Diametral pitch ($P_d$) is a measure of the size of the gear tooth 3. The higher the value of diametral pitch ($P_d$), the smaller is the size of the gear tooth. More particularly, the diametral pitch ($P_d$) is the ratio of the number of teeth in the gear to its standard pitch diameter.

Addendum, another important feature of spur gears, is the radial distance between the tip circle 5 and the standard pitch circle 6. Profile angle ($\phi$) is defined at the point 7 of intersection of the standard pitch circle 6 and the tooth profile. Profile angle ($\phi$) is equal to the angle between a line normal 8 to the pitch circle 6 and a line tangent 9 to the tooth profile. Addendum modification (effects illustrated in FIG. 1(b)) is the amount by which a gear is enlarged or reduced in size generally to satisfy one or more particular constraints.

Figure 2:
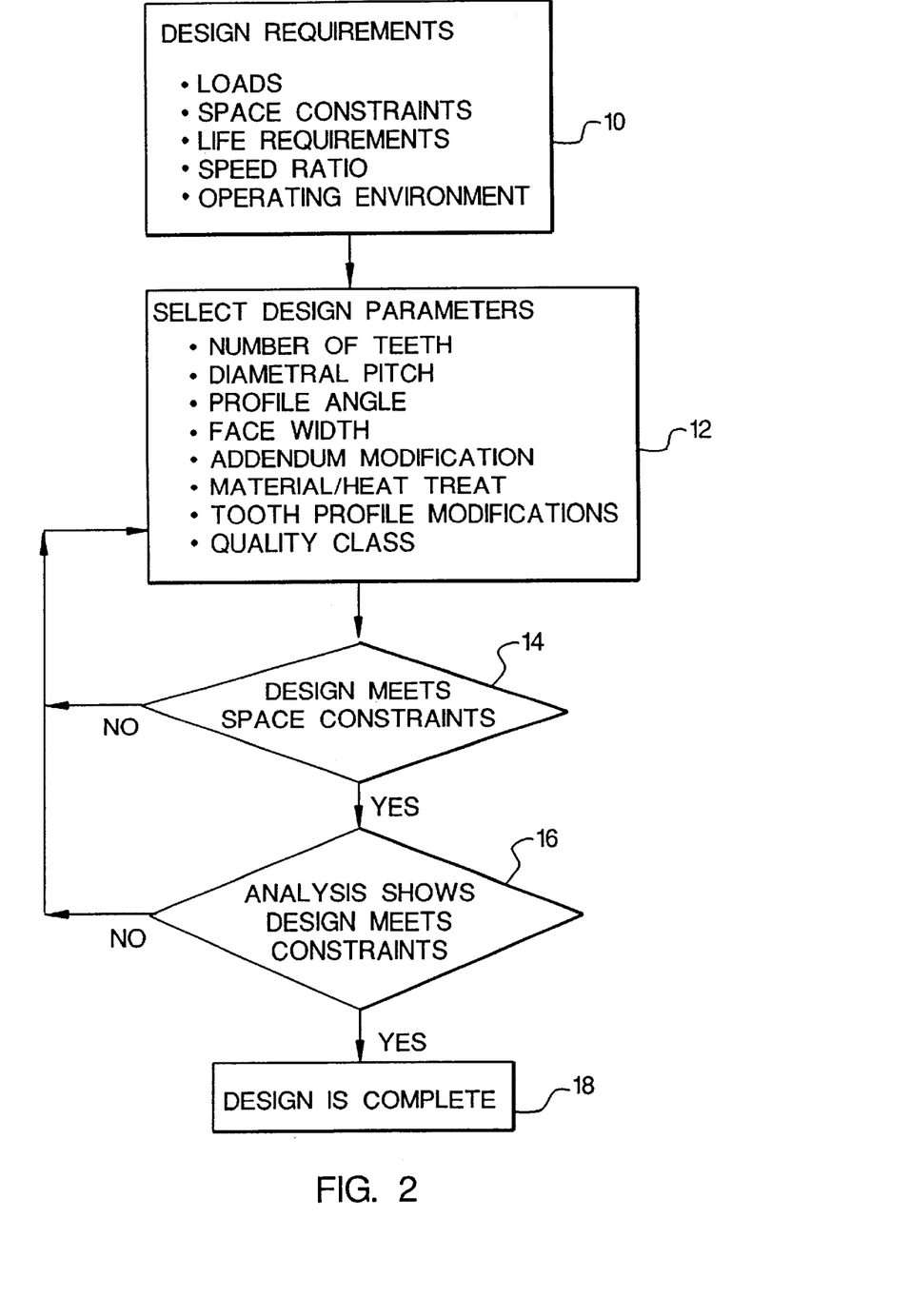
FIG. 2 depicts a typical prior art procedure for designing spur gears.

The procedure for designing gears, particularly spur gears, generally starts with the physical space requirements such as center distance, speed ratio between output and input shafts, etc. As shown in FIG. 2, a flow chart depicts the existing method commonly used in the art for designing spur gears. Broadly described, the current method of designing spur gears involves a combination of two steps, namely synthesis 10 and analysis 16. According to FIG. 2, the synthesis step 10 generates a set of feasible solutions that satisfy physical space constraints or requirements which the gears must satisfy. Thus, in the synthesis step 10, for each feasible solution the geometric design variables 12, such as, number of teeth, profile angle, diametral pitch, and face width, are specified.

In the analysis step 16 (FIG. 2), candidate gear designs 14 are evaluated for performance requirements such as transmitted load/torque needs, vibration, noise, reliability, lubrication, life, etc. Additionally, gear tooth profiles are modified to eliminate interferences that can result from gear tooth and shaft deflections under load and errors in manufacturing and assembly. These modifications, also known as profile modifications (FIG. 1c), help to minimize non-uniform motion, vibration, and noise in load carrying spur gear meshes. If the analysis does not yield acceptable gear designs based on requirements imposed in the synthesis step 10, spur gears having other design parameters 12 are designed and then subjected to analysis 16 in the same fashion.

Skilled artisans will appreciate that selection of number of gear teeth 3 (FIG. 1) has been primarily based on speed ratio, strength, and weight requirements. Additionally, it is well known that the number of teeth 3 in a spur gear should be an integer. This requirement, experience has taught, constrains the actual speed ratio that a given pair of gears can transmit. For a given profile angle (most commonly used is 20 degrees), spur gears with less than 24 teeth usually require addendum modification (profile shift) to avoid undercut or undesirable contact near the base circle of the gear.

In some rotary process applications, the number of gear teeth 3 are chosen such that the numbers are relatively prime. This minimizes the number of times the same tooth pair in the mating gears contacts each other. Erichello discloses a procedure presented in "A Rational Procedure For Designing Minimum Weight Gears," Proceedings of the 1989 ASME International Power Transmission and Gearing Conference, Chicago, Vol. 1, pp. 111–114, for designing minimum weight spur gears and emphasized the presence of an optimum number of teeth in the pinion (mating gear with the smaller number of teeth) that maximizes the load capacity of the gear set.

Presently, a method of making spur gears has not been disclosed in the prior art that involves the selection of number of teeth based on either gear manufacturing requirements or noise and vibration requirements of the rotary equipment.

Those skilled in the art will also appreciate the importance of contact ratio of spur gear meshes (not shown) to overall gear performance. The contact ratio in spur gear meshes is a measure of average number of tooth pairs in contact. For a spur gear mesh with contact ratio equal to 1.6, two tooth pairs are in contact 60% of the time and one tooth pair is in contact 40% of the time. Contact ratio in a given spur gear mesh depends upon variables such as number of teeth, pressure angle, center distance, and diametral pitch. Spur gear meshes with a contact ratio less than 2.0 are called Low Contact Ratio (LCR) gear meshes. Spur gears with contact ratio greater than 2.0 are called High Contact Ratio (HCR) gear meshes. In HCR spur gear meshes, the number of tooth pairs in contact vary from 2 to 3. If an HCR gear mesh has a contact ratio of 2.2, then 3 tooth pairs are in contact 20% of the time and 2 tooth pairs are in contact 80% of the time. As the mating gears rotate, stiffness of the gear changes considerably when number of tooth pairs in contact change from 3 to 2 (in HCR meshes) or from 2 to 1 (in LCR meshes). This periodic change in mesh stiffness results in periodic variation in tooth deflections under load. These tooth deflections coupled with errors in tooth profiles result in periodic variation in motion transmission between the drive and the driven gears. This variation in motion transmission is widely known in the gearing industry as transmission error. In addition, at higher speeds, the transmission error and variation in mesh stiffness act as a dynamic excitor for gear mesh vibration and noise. As the percentage change in mesh stiffness for HCR meshes (change from 2 tooth pairs to 3 tooth pairs) is lower than the percent change in mesh stiffness for LCR meshes (change from 1 tooth pair to 2 tooth pairs), one can expect high quality HCR gear meshes to have lower mesh induced vibration and noise than LCR gear meshes.

It is well known that HCR gear meshes have higher load capacity and show lower gear mesh induced vibration and noise than LCR gear meshes. (See for instance "How to Design Quiet Transmissions," MACHINE DESIGN, by Raymond J. Drago, Dec. 1980; and "Gear Design," SAE Paper No. 680381, by John C. Leming).

Moreover, U.S. Pat. No. 1,525,642 by Anthony B. Cox, discloses gears with integral contact ratios that exhibit constant number of tooth pairs in contact. Such gears have constant length of line of theoretical tooth contact carrying the transmitted load.

Further, the use of integer contact ratios to achieve constant mesh stiffness which show substantial noise reduction over a range of loads is disclosed in "The Reduction of Gear Pair Transmission Error by minimizing Mesh Stiffness Variation," American Gear Manufacturers Association, Paper No. 88-FTM-11, by W. S. Rouverol and W. J. Pearce. In order to achieve constant mesh stiffness, one needs to balance the compliances of the pinion and the gear tooth. Balancing the compliances of the pinion and the gear is achieved by varying the thicknesses of the tooth. However, the benefit of integral contact ratios is lost when errors in tooth profile during manufacturing change the actual contact ratio to a non-integral value.

Current gear design procedures vary geometric gear design variables to achieve designs with high contact ratio that meet strength and space requirements. To date, no studies have been reported on the interaction between selection of contact ratio and operating speeds of the rotary equipment during the gear design process.

Therefore, a need persists in the art for a method for designing a uniform motion, substantially vibration-free spur gears useful in rotary processes that take into account such factors as contact ratio and number of gear teeth, and that is reliable, easy to use and requires a relatively short production cycle time to carry out.

SUMMARY OF THE INVENTION

It is, therefore, an object of the invention to provide a method for designing spur gears that have uniform motion and are vibration free.

Another object of the invention is to provide a method for designing spur gears that takes into account contact ratios of the gear mesh as well as the number of gear teeth.

Yet another object of the invention is to provide a method for designing spur gears in which discrimination between the gear mesh frequency determines acceptable gear designs.

It is a feature of the invention that gear mesh frequency and its multiples are computed for certain selectable gear designs and then compared with a predetermined rotary process frequency and its multiples which results in one or more optimum spur gear designs.

To overcome one or more problems in the prior art, there is provided a method for designing uniform motion, vibration-free intermeshing spur gears useful in a rotary process. Generally, such rotary process has both a predetermined process frequency and rotary speed and is configured to conform with predetermined space constraints. Included in the method are the steps of: (a) providing a predetermined speed ratio for the intermeshing gears; (b) selecting (n) sets of values, each set of the (n) sets of values representing a gear design, the values including at least number of teeth, diametral pitch ($P_d$), profile angle ($\phi$), face width (W) and addendum modification (h); (c) determining whether the gear designs defined by each of the (n) sets of value satisfies the space constraints and the speed ratio; (d) selecting the gear designs satisfying the space constraints and the speed ratio; (e) from the gear designs selected in step (d), computing said gear mesh frequency and up to at least (m) multiples, wherein (m) is an integer; (f) computing multiples of the process frequency up to about (k) multiples, wherein (k) is an integer; (g) comparing each of the (m) multiples of the gear mesh frequency to each of the (k) multiples of the process frequency, wherein non-matching (m) and (k) multiples resulting from said comparison define selectable gear designs; (h) analyzing the selectable gear designs for at least a predetermined load bearing capability and conformance with predetermined contact ratios of the intermeshing gears; and (i) selecting the selectable gear designs remaining after step (h).

It is, therefore, an advantageous effect of the invention that uniform motion, substantially vibration-free spur gear designs can be reliably designed based on computations of gear mesh frequency and contact ratio.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

An important objective of the invention is to provide a methodology to select a number of teeth in a gear and select contact ratio in a gear mesh such that the gear drive system transmits uniform motion with low vibration and noise at operating speeds of rotary equipment. As indicated, the invention is primarily useful in rotary equipment such as punchers, choppers, slitters, copiers and printers where the gear mesh frequency and its harmonics (number of teeth times revolutions per second) could coincide with the process frequency and its harmonics. Moreover, the invention has utility in rotary equipment where high operating speeds coincide with gear mesh resonance speeds corresponding to the periodic variation that occurs twice or thrice per tooth cycle in a gear mesh.

Illustrated in FIG. 1, a typical spur gear 1 is designed with a number of teeth 3 such that the gear mesh frequency and its second, third, and fourth multiples do not coincide with process frequency (e.g. number of punches per revolution, number of blades per revolution, timing belt tooth frequency, motor commutation frequency, etc.) and its second, third, and fourth multiples. If the gear mesh frequency and its multiples coincided with the process frequency and its multiples, the design will make it impossible to differentiate between the excitations due to the gear mesh (not shown) and periodic forces in the process. Additionally, from a structural vibration point of view, periodic process forces and gear mesh stiffness variation will act together and increase the vibration and noise level in rotary equipment.

In accordance with the invention, spur gear meshes are designed to have a contact ratio of 2.5 or 1.5. Gear meshes with contact ratio of 2.5 have 3 tooth pairs in contact 50% of the time and 2 tooth pairs in contact in the remaining 50% of the time. Gear meshes with contact ratio of 1.5 have 2 tooth pairs in contact 50% of the time and 1 tooth pair in contact in the remaining 50% of the time. In such cases, the fourier transform of the loaded transmission error shows large amplitudes for odd multiples (1×, 3×, 5×, etc.) of tooth mesh frequency and very small amplitudes for even multiples (2×, 4×, 6×, etc.) of tooth mesh frequency. The amplitude of vibration and noise at critical resonance speeds of a gear mesh are directly related to the corresponding amplitudes of transmission error. Hence, operating the gear drive in rotary equipment at critical speeds that correspond to the even multiples of mesh frequency results in lower vibration and lower noise.

In our preferred embodiment, HCR gear meshes are preferred over LCR gear meshes due to lower mesh stiffness variation and higher mesh stiffness. Therefore a contact ratio of 2.5 is preferred as a first choice in the design process of the invention.

Similarly, in accordance with the invention, spur gear meshes may also be designed to have a contact ratio of 1.33, 1.66, 2.33, or 2.66. Gear meshes with contact ratios of 2.33 and 2.66 have 3 tooth pairs in contact 33% and 66% of the time respectively. Similarly, gear meshes with contact ratios of 1.33 and 1.66 have 2 tooth pairs in contact 33% and 66% of the time respectively. In such cases, the fourier transform of the loaded transmission error shows small amplitudes for third multiples (3×, 6×, 9×, etc.) of tooth mesh frequency. When spur gear meshes are designed with contact ratios such as 1.33, 1.66, 2.33, or 2.66, the drive system should be operated at critical speeds that correspond to the third multiples of mesh frequency.

The method of the invention involves an assessment of the space requirements in which the gears will operate. FIG. 2 shows the steps involved in the current gear design procedure. Typically, parameters such as gear ratio and center distance are specified, i.e. one would have limited space to size and locate the individual gears. It is important to note that the number of teeth on the pinion and the gear should be an integer. For a given center distance and gear ratio, there may be few choices for the number of teeth for the pinion and the gear. As one increases the number of teeth, the size of the teeth become smaller and their load carrying capacity decreases. In most cases, the upper limit for the number of teeth is defined by the strength requirements. The lower limit for the number of teeth is usually based on pitting strength and the minimum number of teeth to avoid undercut. The minimum number of teeth to avoid undercut varies with the profile angle of the gear/pinion.

In most cases, values for variables such as the number of teeth 3 (FIG. 1) on the pinion and gear, profile angle ($\phi$), diametral pitch ($P_d$), and face width (W) are chosen such that the design satisfies performance requirements such as tooth bending strength, surface durability, pitting resistance, fatigue strength, etc.

Figure 3:
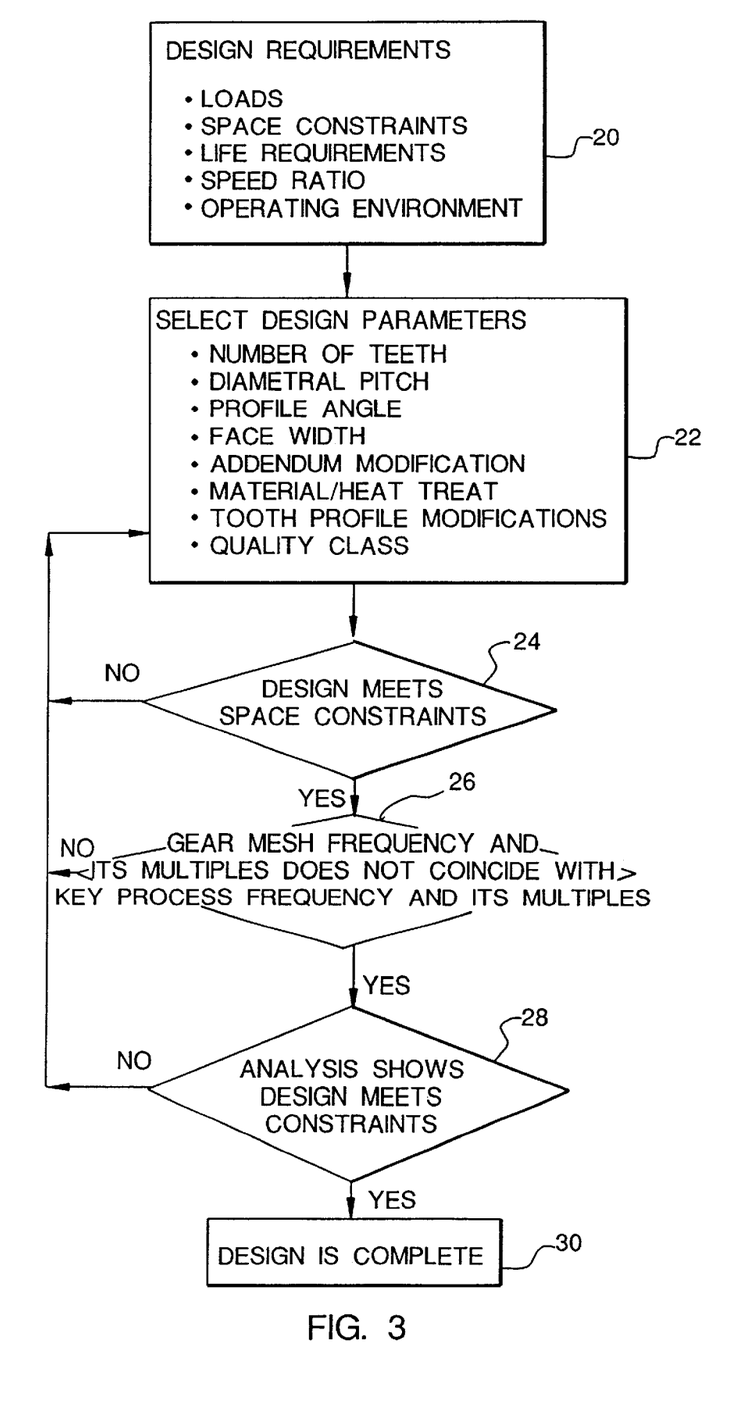
FIG. 3 illustrates the method of the invention for designing spur gears.

Referring to FIG. 3, a flow chart of the method of producing spur gears in accordance with the invention is illustrated. As shown, the present method utilizes important limitations and modifications not taught or suggested in the prior art. More particularly, the following two important requirements are included by the present invention, to wit: 1) Gear mesh frequency should not coincide with key process frequency 26 such as number of punches per cycle, number of blades per revolution, timing belt tooth frequency, motor commutation frequency, etc.; and 2) Contact ratio should equal 1.33 or 1.5 or 1.66 or 2.33 or 2.5 or 2.66, etc.

The requirement on gear mesh frequency ensures that dynamics of the process/apparatus is not augmented by the dynamics of the gear mesh. Gear mesh frequency is a function of number of teeth and rotational speed and is given by:

Gear mesh frequency=number of teeth*number of revolutions per second; where gear mesh frequency is a measure of number of teeth that come into contact and leave contact per second.

Gear Design Example

In this application, the key process parameter was 96 cycles per revolution of the gear. The number of teeth 3 in the pinion and the gear was chosen to be 60. If the gear 1 is rotating at 1 revolution per second, the gear mesh frequency and its multiples are 60 Hz, 120 Hz, 180 Hz, 240 Hz, 300 Hz, 360 Hz, 420 Hz, 480 Hz, etc. and the key process frequency and its multiples are 96 Hz, 192 Hz, 288 Hz, 384 Hz, 480 Hz, etc. In this example, the $8^{th}$ multiple of gear mesh frequency coincides with the $5^{th}$ multiple of key process frequency. This could have been avoided if the number of spur gear teeth was selected to be 59 instead of 60. However, there were other gear manufacturing and assembly considerations that necessitated the number of teeth to be a multiple of 4. The indexing method in the manufacturing process used 4 steps in 1 degree of rotation. This implied that the number of teeth should be a multiple of 4.

From practical experience, it has been known that our rotary equipment was not sensitive to excitations at frequencies that were higher than the $5^{th}$ multiple of the gear mesh frequency. Therefore, this invention allowed us to differentiate between the excitations due to the gear mesh and intermittent forces in the process, allowing process monitoring and control.

Figure 4:
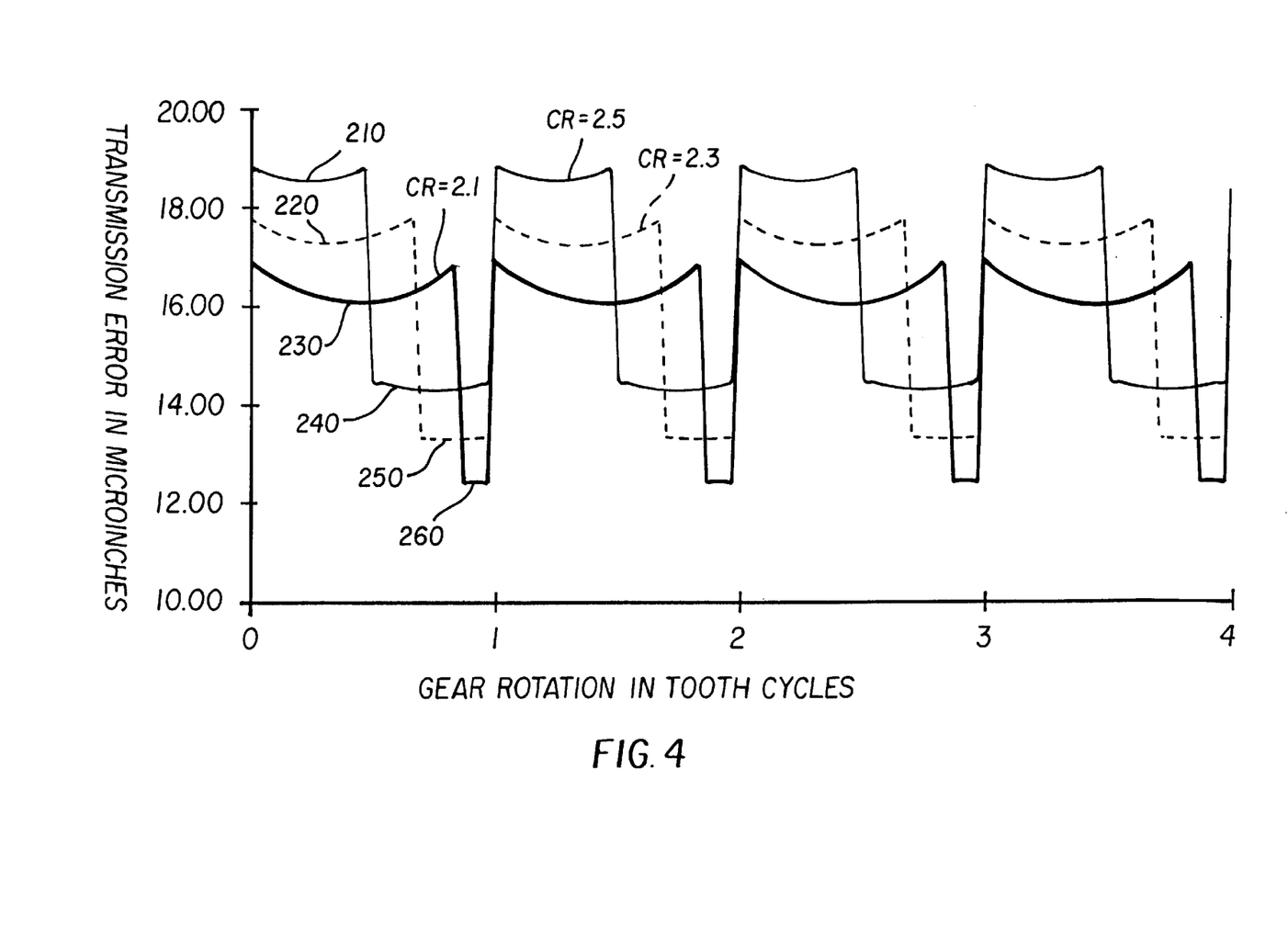
FIG. 4 depicts the static transmission error for 4 mesh cycles for three spur gear meshes with contact ratios: 2.1, 2.3, and 2.5.
Figure 5:
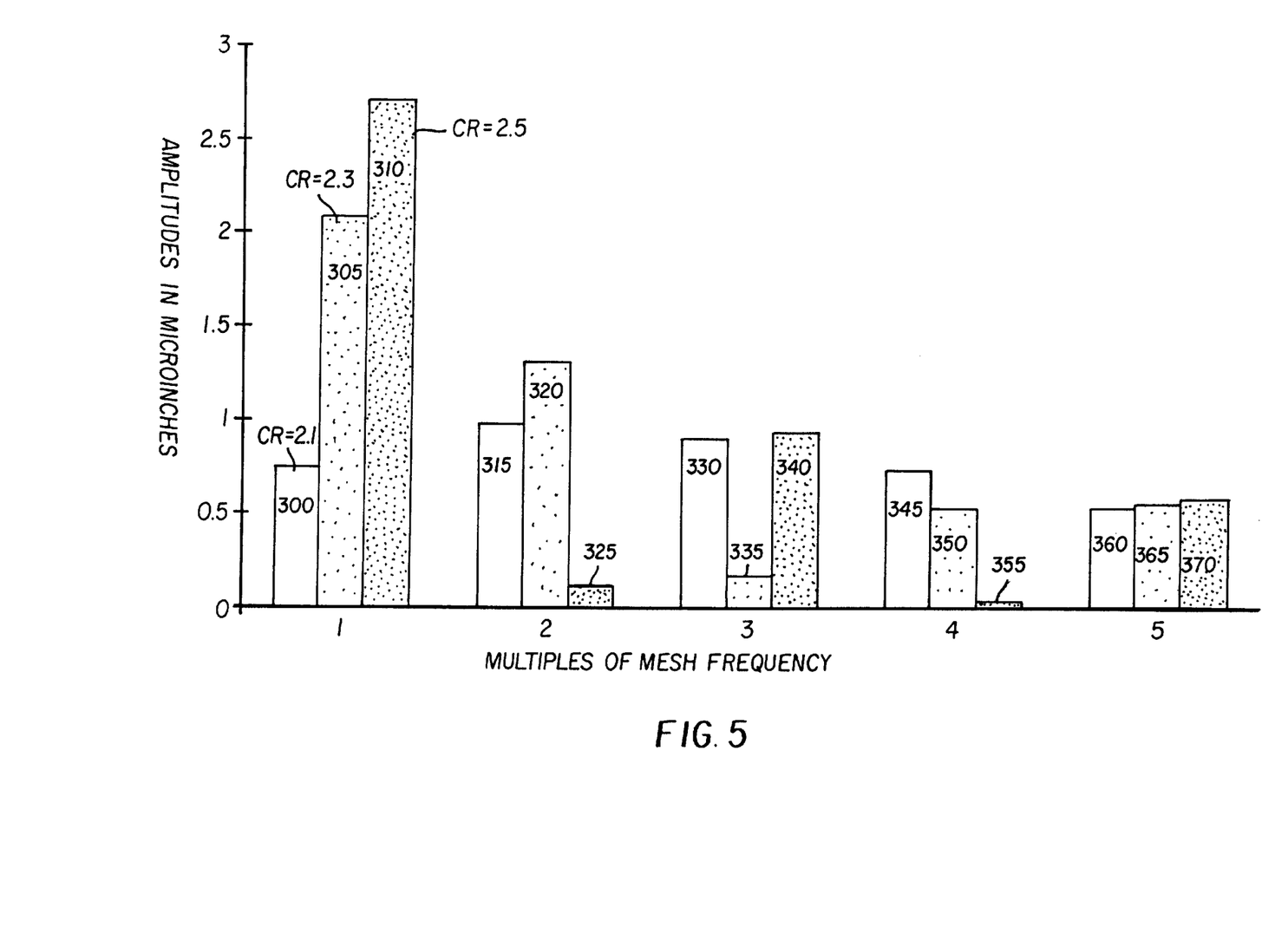
FIG. 5 depicts the fourier amplitudes of the static transmission error curves shown in FIG. 4.

The requirement on the contact ratio is based on the profile of the static transmission error for one tooth mesh cycle. According to FIG. 4, the variation of transmission error for 4 tooth mesh cycles for spur gear meshes with contact ratios 2.1, 2.33, and 2.5 is illustrated. The transmission error was computed using a computer program, preferably Load Distribution Program™ developed at the Ohio State University as disclosed in "Load Distribution Program Manual," Gear Dynamics and Gear Noise Research Laboratory, Department of Mechanical Engineering, Ohio State University, Columbus, Ohio, and "Gear Noise Sources and Their Prediction Using Mathematical Models," by D. R. Houser, 1985 OEM Conference in Philadelphia, Sep. 11, 1985. In FIG. 4, features designated as 210, 220, and 230, represent transmission error when there are 2 tooth pairs in contact for spur gear meshes with contact ratios 2.5, 2.3, and 2.1 respectively. Similarly, features designated as 240, 250, and 260, represent transmission error when there are 3 tooth pairs in contact for spur gear meshes with contact ratios 2.5, 2.3, and 2.1 respectively. For the gear mesh with contact ratio 2.5, features designated 210 and 240 show that the amount of time 3 and 2 tooth pairs are in contact are nearly equal. Similarly, for the gear mesh with contact ratio 2.3, features designated 220 and 250 show that the amount of time 2 tooth pairs are in contact is twice the amount of time 3 tooth pairs are in contact. Similarly, for the gear mesh with contact ratio 2.1, features designated 230 and 260 show that, most of the time, there are two tooth pairs in contact. For all the three gear meshes, the peak to peak amplitudes (maximum value minus minimum value in one cycle) of the transmission error are nearly equal. FIG. 5 shows the results of the fourier transform of the static transmission error for the three spur gear meshes in FIG. 4.

According to FIG. 5, features designated as 300, 315, 330, 345, 360 represent the amplitudes of the fourier transform of the transmission error at the $1^{st}$, $2^{nd}$, $3^{rd}$, $4^{th}$, and $5^{th}$ multiples of gear mesh frequency for the spur gear mesh with contact ratio equal to 2.1. Similarly, features designated as 305, 320, 335, 350, and 365 represent the amplitudes of the fourier transform of the transmission error at the $1^{st}$, $2^{nd}$, $3^{rd}$, $4^{th}$, and $5^{th}$ multiples of gear mesh frequency for the spur gear mesh with contact ratio equal to 2.3. Similarly, features designated as 310, 325, 340, 355, and 370 represent the amplitudes of the fourier transform of the transmission error at the $1^{st}$, $2^{nd}$, $3^{rd}$, $4^{th}$, and $5^{th}$ multiples of gear mesh frequency for the spur gear mesh with contact ratio equal to 2.5. In FIG. 5, the spur gear mesh with contact ratio equal to 2.5 has very small amplitudes at the $2^{nd}$ and $4^{th}$ multiples of the gear mesh frequency, indicated by features 325 and 355. Referring again to FIG. 5, the spur gear mesh with contact ratio equal to 2.3 has a small amplitude at the $3^{rd}$ multiple, designated as feature 335.

The transmission error data is used as an input to execute a computer program that was developed at the Ohio State University and further modified by the inventors. The computer model is based on the technique detailed in "Dynamic Analysis of High Speed Gears by using Loaded Static Transmission Error" by H. N. Ozguven and D. R. Houser, Journal of Sound and Vibration, 1988, Vol. 125, pages 71–83. The model analyzes the dynamics of the gear mesh at various rotational speeds of the gear.

One of the outputs from the computer program is dynamic factor, which is a ratio of dynamic tooth load to static tooth load for a given rotational speed. At speeds of resonance, also known as critical speeds, the value of the dynamic load will be much higher than the static load. The resonance frequency in a tooth mesh is a function of average mesh stiffness and the rotational inertia of the system and is given by:

$$\text{Resonance frequency } (\omega) \text{ in rad/sec} = \sqrt{\text{average stiffness / system rotational inertia}}$$

The rotational speed that corresponds to the resonance frequency is called as first critical speed and given by:

$$\text{Critical speed in rpm} = w*60/(2*\pi*\text{number of teeth})$$

Figure 6:
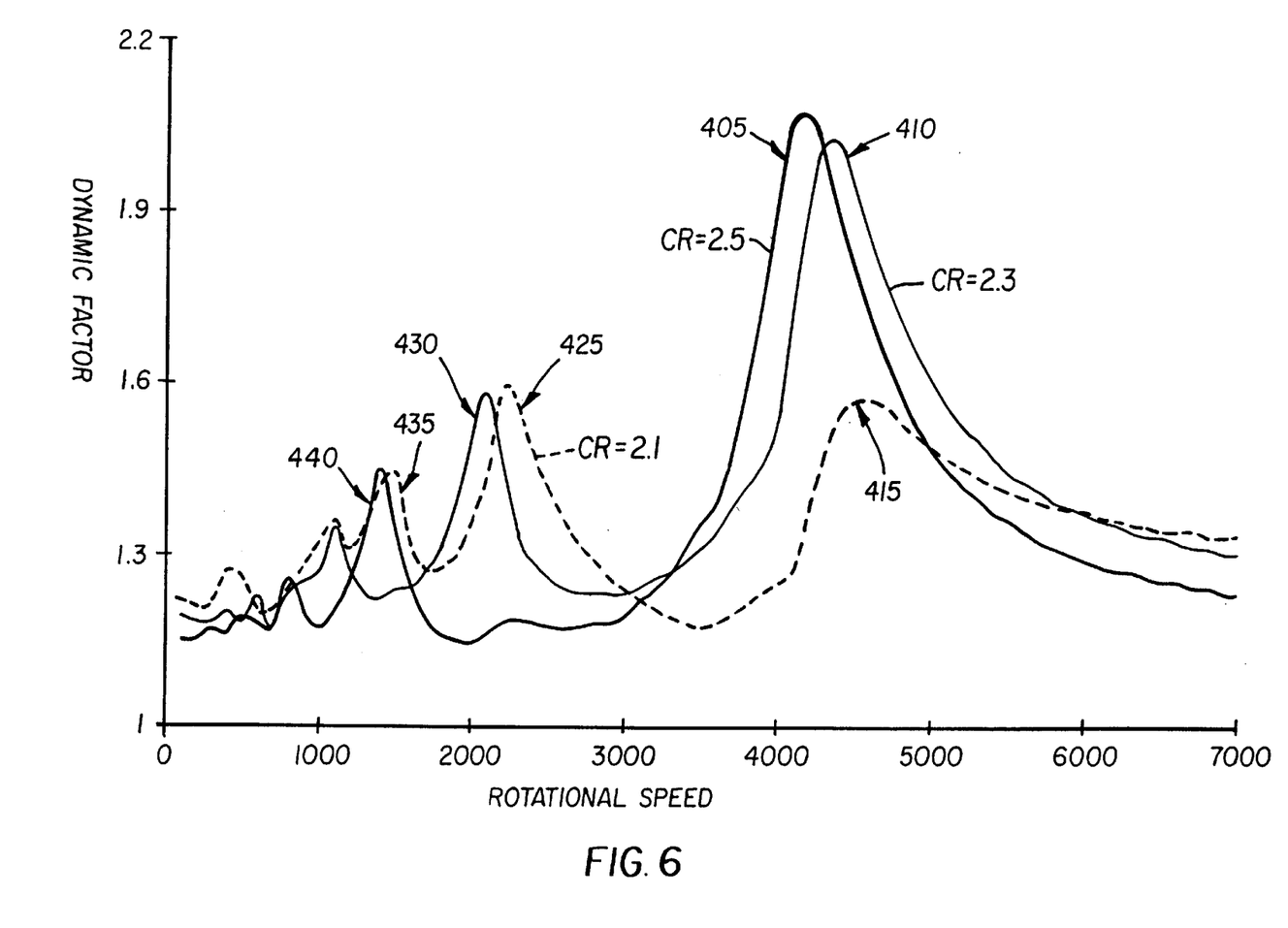
FIG. 6 depicts the dynamic factor for various rotational speeds for three spur gear meshes with contact ratios 2.1, 2.3, and 2.5.

Turning now to FIG. 6, the dynamic factor at various rotational speeds for the three spur gear meshes in the descriptions of FIGS. 4 and 5 is illustrated. In FIG. 6, feature 415 corresponds to the peak dynamic factor at first critical speed (approximately equal to 4400 rpm). Also in FIG. 6, feature 425 refers to the peak dynamic factor that occurs at half the critical speed, approximately equal to 2200 rpm. This response corresponds to the second multiple of mesh frequency, as a periodic excitation that occurs twice per tooth cycle can be expected to cause resonance at half the critical speed. Similarly, feature 435 refers to the peak dynamic factor that occurs at one-third the critical speed, approximately equal to 1400 rpm. This response corresponds to the third multiple of mesh frequency, as a periodic excitation that occurs thrice per tooth cycle can be expected to cause resonance at one-third the critical speed.

Referring again to FIG. 5, the amplitude for the first three multiples of mesh frequency, denoted by features 300, 315, and 330, are nearly equal for the gear mesh with contact ratio equal to 2.1. Correspondingly, in FIG. 6, we do not see a significant difference in the dynamic factor values, denoted by features 415, 425, and 435, at critical speed, one-half of the critical speed, and one-third of the critical speed respectively.

According to FIG. 6, in contrast, dynamic factor graph for the spur gear mesh with contact ratio equal to 2.5 depicts unique characteristics of gears designed in accordance with the invention. Feature 405 represents the peak resonant response of the gear mesh at the critical speed, which is approximately equal to 4200 rpm. However, the dynamic response of the gear mesh at half the critical speed is very small. There exists only a small variation in the dynamic factor for speeds ranging from 1800 rpm to 3000 rpm. It is also interesting to note that in FIG. 5 the amplitude of the transmission error, designated as feature 325, at the $2^{nd}$ multiple of gear mesh frequency is very small. As there exists only a small periodic excitation at the second multiple, the dynamic response of the system at half the critical speed is very small. This feature provides a great advantage for engineers to operate the gear mesh in a wide design window (range of speeds) where the dynamic response of the system is very small. As the amplitude at the third multiple of gear mesh frequency was significant, denoted by feature 340, the system shows a large dynamic factor at one-third the critical speed. However, since the amplitude of the transmission error at the first multiple, denoted as feature 310, was much higher than the one at the third multiple, designated feature 340, the dynamic factor, designated as feature 405, at the critical speed, is much higher than the dynamic factor at one-third the critical speed, designated as feature 440.

Referring further to FIG. 6, similarly, the dynamic factor graph for the spur gear mesh with contact ratio equal to 2.3 depicts other unique characteristics of gears made in accordance with the invention. Feature 410 represents the peak resonant response of the gear mesh at the critical speed, which is approximately equal to 4200 rpm. However, the dynamic response of the gear mesh at one-third the critical speed is very small. There exists only a small variation in the dynamic factor for speeds ranging from 1300 rpm to 1500 rpm. In FIG. 5, the amplitude of the transmission error (feature 335) at the $3^{rd}$ multiple of gear mesh frequency is very small. As there exists only a small periodic excitation at the third multiple, the dynamic response of the system at one-third the critical speed is non-existent. As the amplitude at the second multiple of gear mesh frequency was significant 320, the system shows a large dynamic factor at half the critical speed. However, since the amplitude of the transmission error at the first multiple (Feature 305) was much higher than the one at the second multiple (Feature 320), the dynamic factor at the critical speed (Feature 410) is much higher than the dynamic factor at one-third the critical speed (Feature 430).

For high quality spur gear meshes, HCR gear meshes are preferred as they show higher mesh stiffness and lower mesh stiffness variation. As shown in FIG. 3, the method of the invention incorporates these recommendations as a design constraint during the design process. The choice of contact ratio can be made based on the rotational speed, or the choice of the rotational speed can be based on the dynamic response of the gear mesh. It is well known that large errors in gear tooth profile can effectively change the shape of the transmission error curve, thereby changing the dynamic response of the gear mesh. This invention, therefore, is applicable in high quality gears where small errors in tooth profiles do not change the shape of the transmission error curve substantially. Furthermore, this invention may or may not have limited applicability to high load-density applications where large tooth deflections may require the use of tooth profile modifications (FIG 1c), that can also change the shape of the transmission error curve.

The invention has been described with reference to a preferred embodiments and, in particular a method of designing spur gears. Those skilled in the art will appreciate that the method of the invention has applicability to various other types of gears including helical, cross helical, bevel and worm gears. Thus, it will be appreciated that variations and modifications can be effected by a person of ordinary skill in the art without departing from the scope of the invention.

PARTS LIST:

1 gear
3 teeth of gears 1
4 gear body
5 tip circle
6 standard pitch circle
7 point of intersection
8 line normal to standard pitch circle
9 line tangent to tooth profile
10 gear design requirements
12 gear design parameters
14 selectable gear designs of prior art process based on space constraints
16 analysis of selectable gear designs
18 final gear design selection
20 design requirements for new design method
22 selectable design parameters for new design method
24 selectable gear designs of new process based on space constraints
26 computation of gear mesh frequency and its multiples and comparison process frequency and its multiples
28 analysis of selectable gear designs of new design method
30 final gear design selection of new design method
210 transmission error
220 transmission error
230 transmission error
240 transmission error
250 transmission error
260 transmission error
300 amplitudes of fourier transform of the transmission error at $1^{st}$ multiple
305 amplitude of fourier transform of transmission error at $1^{st}$ multiple
310 amplitude of fourier transform of transmission error at $1^{st}$ multiple
315 amplitudes of fourier transform of the transmission error at $2^{nd}$ multiple
320 amplitude of fourier transform of transmission error at $2^{nd}$ multiple
325 amplitude of fourier transform of transmission error at $2^{nd}$ multiple
330 amplitudes of fourier transform of the transmission error at $3^{rd}$ multiple
335 amplitude of fourier transform of transmission error at $3^{rd}$ multiple
340 amplitude of fourier transform of transmission error at $3^{rd}$ multiple
345 amplitudes of fourier transform of the transmission error at $4^{th}$ multiple
350 amplitude of fourier transform of transmission error at $4^{th}$ multiple
355 amplitude of fourier transform of transmission error at $4^{th}$ multiple
360 amplitudes of fourier transform of the transmission error at $5^{th}$ multiple
365 amplitude of fourier transform of transmission error at $5^{th}$ multiple
370 amplitude of fourier transform of transmission error at $5^{th}$ multiple
405 peak dynamic factor at first critical speed of gear mesh
410 peak dynamic factor at first critical speed of gear mesh
415 peak dynamic factor at $1^{st}$ critical speed of the gear mesh
425 peak dynamic factor at one-half critical speed of the gear mesh
430 peak dynamic factor at one-half critical speed of the gear mesh
435 peak dynamic factor at one-third critical speed of the gear mesh
440 peak dynamic factor at one-third critical speed of the gear mesh

What is claimed is:

1. A method of designing uniform motion, substantially vibration-free intermeshing spur gears useful in a rotary process having a predetermined process frequency and rotary speed, said rotary process being configured to conform with predetermined space constraints, said method comprising the steps of:

(a) providing a predetermined speed ratio for said intermeshing gears;

(b) selecting (n) sets of values, each set of said (n) sets of values representing a gear design, said values including at least number of teeth, diametral pitch ($P_d$), profile angle($\phi$), face width (W) and addendum modification (h);

(c) determining whether said gear designs defined by each of said (n) sets of value satisfies said space constraints and said speed ratio;

(d) selecting said gear designs satisfying said space constraints and said speed ratio;

(e) from said gear designs selected in step (d), computing said gear mesh frequency and up to at least (m) multiples, wherein (m) is an integer;

(f) computing multiples of said process frequency up to about (k) multiples, wherein (k) is an integer;

(g) comparing each of said (m) multiples of said gear mesh frequency to each of said (k) multiples of said process frequency, wherein nonmatching (m) and (k) multiples resulting from said comparison define selectable gear designs;

(h) analyzing said selectable gear designs for at least a predetermined load bearing capability and conformance with predetermined contact ratios of said intermeshing gears; and (i) selecting said selectable gear designs remaining after step (h).

2. The method recited in claim 1 wherein the step of selecting (n) sets of values includes the step of selecting a minimum number of teeth (N).

3. The method recited in claim 1 wherein the step of computing multiples of said process frequency further includes the step of accounting for any other vibrational characteristics of said rotary process.

4. The method recited in claim 1 wherein the step of comparing (m) multiples of said gear frequency with each of said (k) multiples of said process frequency includes the step of identifying any of said (m) multiples that substantially equals any of said (k) multiples.

5. The method recited in claim 4 wherein after said identifying step further including the step of eliminating any gear designs corresponding to any one of said (m) multiples which is substantially equal to any one of said (k) multiples.

6. The method recited in claim 1 wherein said predetermined contact ratio of said intermeshing gears of step (i) is about 1.33.

7. The method recited in claim 1 wherein said predetermined contact ratio of said intermeshing gears of step (i) is about 1.5.

8. The method recited in claim 1 wherein said predetermined contact ratio of said intermeshing gears of step (i) is about 1.66.

9. The method recited in claim 1 wherein said predetermined contact ratio of said intermeshing gears of step (i) is about 2.33.

10. The method recited in claim 1 wherein said predetermined contact ratio of said intermeshing gears of step (i) is about 2.5.

11. The method recited in claim 1 wherein said predetermined contact ratio of said intermeshing gears of step (i) is about 2.66.

12. The method recited in claim 1 further including, after step (i), the steps of determining and comparing dynamic responses of said gear intermesh of said selectable gear designs at various rotation speeds and then selecting from among said selectable gear designs a gear design corresponding to the lowest dynamic response at the predetermined process speed.

* * * * *